United States Patent Office 3,000,904
Patented Sept. 19, 1961

3,000,904
DIOXANES
Donald G. Kundiger, Manhattan, Kans., and John H. Hennes, Freeport, Tex., assignors to The Dow Chemical Company, Midland, Mich., a corporation of Delaware
No Drawing. Filed July 3, 1958, Ser. No. 746,332
6 Claims. (Cl. 260—340.7)

The present invention is concerned with new dialkoxy dioxane compounds and is directed to novel 2,4-bis-(polychloroalkyl)-6,6-dialkoxy-1,3-dioxanes.

The novel compounds of the present invention are characterized by the formula

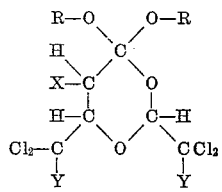

In this and succeeding formulas, each of the symbols R represents an alkyl radical, the symbol X represents hydrogen or a lower alkyl radical and the symbol Y represents chlorine, chloromethyl or α-chloroethyl. The expression lower alkyl is employed in the specification and claims to refer to an alkyl radical containing from 1 to 4 carbon atoms, inclusive. These compounds are liquids or crystalline solids, somewhat soluble in many organic solvents and relatively insoluble in water, and are useful as insecticides, herbicides and fungicides and as intermediates in the preparation of 1,3-dioxan-6-one compounds having the formula

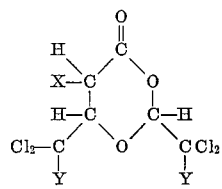

which latter compounds are useful as herbicides, particularly for the control of grass species, such as water grass and Japanese millet.

The new 2,4-bis(polychloroalkyl)-5-alkyl-6,6-dialkoxy-1,3-dioxane compounds may be prepared by condensing a trialkyl orthoalkanoate having the formula

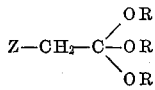

wherein the symbol Z represents hydrogen or a lower alkyl radical, with a suitable polychloroaldehyde. The term "polychloroaldehyde" as herein employed should be understood to refer to a member of the group consisting of chloral, α,α,β-trichloropropionaldehyde and α,α,β-trichlorobutyraldehyde. Good results are obtained when employing at least two molecular proportions of anhydrous polychloroaldehyde for each molecular proportion of the orthoalkanoate. The reaction is somewhat exothermic and takes place smoothly at temperatures from 25° to 120° C. The temperature of the reaction may be controlled by regulating the rate of contacting the reactants as well as by the addition or subtraction of heat as required. Conveniently the reaction may be carried out at the boiling temperature and under reflux conditions.

The new 2,4-bis(polychloroalkyl)-6,6-dialkoxy-1,3-dioxanes, wherein the 5-position on the ring is unsubstituted, may be prepared by condensing a trialkylorthoacetate having the formula

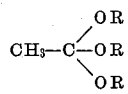

with an equimolecular proportion of a polychloroaldehyde and thereafter condensing the product of this condensation reaction with a second molecular proportion of the same polychloroaldehyde. The reaction proceeds smoothly, although somewhat exothermic, at temperatures of from 25° to 120° C. The temperature may be controlled in the previously described manner. A small amount of pyridine may be added to catalyze the reaction if desired. Following the reactions above described, the desired product may be separated in conventional manner such as by fractional distillation, solvent extraction, filtration and/or decantation.

In carrying out the reaction, the trialkyl orthoalkanoate is mixed or otherwise blended with the polychloroaldehyde at a temperature of from about 0° to 25° C. The reaction is initiated readily when the reactants are contacted. The reaction is somewhat exothermic and the temperature of the reaction mixture may rise to from 30° to 120° C. Thereafter, the mixture is heated at the boiling temperature and under reflux for from 10 to 40 hours. The resulting reaction mixture may be fractionally distilled under reduced pressure to remove the low boiling constituents and to obtain the desired product as a residue. The product, if a solid, may be recovered by adding water to the reaction mixture to precipitate the desired product as a crystalline solid which may be purified further by recrystallization from a suitable organic solvent. The product, if a liquid, can be recovered by solvent extraction, washing or fractional distillation under reduced pressure.

The following examples illustrate the invention but are not to be construed as limiting the same:

*Example 1.—2,4-bis(trichloromethyl)-5-methyl-6,6-diethoxy-1,3-dioxane*

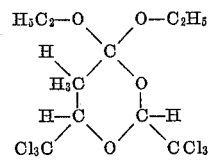

Eighty-eight and one-tenth grams (0.5 mole) of triethyl orthopropionate was slowly added to 147.4 grams (1.0 mole) of anhydrous chloral. Over a 17 minute period, the temperature of the reaction mixture rose to 115° C. During the following four hours the temperature of the reaction vessel and contents gradually fell to room temperature. Thereafter the reaction mixture was heated to the boiling temperature (106°–111° C.) and maintained under reflux for about 20 hours. The reaction vessel and contents were then cooled to room temperature and 200 milliliters of water added slowly. During the addition of the water the reaction mixture was constantly stirred. A solid precipitate formed and was recovered by filtration. The filter cake was recrystallized from 95 percent ethyl alcohol to obtain a 2,4 - bis(trichloromethyl) - 5 - methyl - 6,6 - diethoxy-1,3-dioxane product as a crystalline solid. The latter was found to melt at 81°–82° C.

*Example 2.—2,4-bis(trichloromethyl)-5-methyl-6,6-dimethoxy-1,3-dioxane*

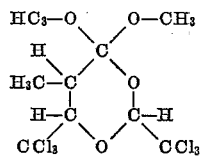

Twenty and one-tenth grams (0.15 mole) of trimethyl orthopropionate was slowly added to 44.2 grams (0.30 mole) of anhydrous chloral. Over a period of 40 minutes the temperature of the reaction mixture rose to 56° C. Upon standing over night the temperature of the reaction mixture fell to room temperature. Thereafter the resulting mixture was heated at the boiling temperature (100° C.) and under reflux for 24 hours. The resulting mixture was fractionally distilled under reduced pressure to remove the low boiling constituents and to obtain a 2,4-bis(trichloromethyl)-5-methyl-6,6-dimethoxy-1,3-dioxane product as a liquid residue. This product had a boiling point of 105°–107° C. at 0.2 millimeters of mercury and a refractive index ($n/D$) of 1.495 at 27° C.

*Example 3.—2,4-bis(1,1,2-trichloropropyl)-5-methyl-6,6-dimethoxy-1,3-dioxane*

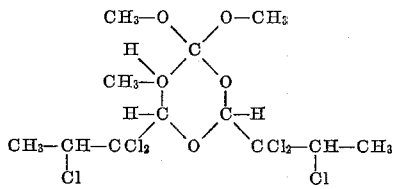

Sixty-seven and one-tenth grams (0.5 mole) of trimethyl orthopropionate was added to 175.5 grams (1.0 mole) of 2,2,3-trichlorobutyraldehyde. Over a five minute period the temperature of the reaction mixture rose to 37° C. The reaction mixture was thereafter heated at the boiling temperature (118°–128° C.) and maintained under reflux for 33 hours. The resulting mixture was fractionally distilled under reduced pressure to remove the low boiling constituents and to obtain a crude 2,4-bis(1,1,2-trichloropropyl)-5-methyl-6,6-dimethoxy-1,3-dioxane product as a dark brown, viscous liquid. The latter was dissolved in methanol and decolorized with activated charcoal. The decolorized prodduct was crystallized from the methanol solution and the crystalline solid recovered by filtration to obtain a purified solid product, melting at 112°–113° C.

*Example 4.—2,4-bis(trichloromethyl)-5-propyl-6,6-dimethoxy-1,3-dioxane*

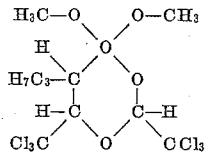

Eighty-one and one-tenth grams (0.5 mole) of trimethyl ortho-n-valerate was added with stirring to 147.4 grams (1.0 mole) of anhydrous chloral. Over a one-half hour period the temperature rose to 53° C. The reaction vessel and contents were thereafter maintained at a temperature of 50° C. for two hours after which they were slowly cooled to room temperature. Thereafter the mixture was heated to the boiling temperature (112° C.) and under reflux for 24 hours. During the heating the temperature dropped to 84° C. and remained thereat for the remainder of the heating period. The resulting mixture was fractionally distilled under reduced pressure to obtain as a liquid residue a 2,4-bis(trichloromethyl)-5-propyl-6,6-dimethoxy-1,3-dioxane product having a boiling point of 123°–125° C. at 2 millimeters of mercury.

The latter had a refractive index ($n/D$) of 1.4950 at 20° C.

*Example 5.—2,4-bis(trichloromethyl)-6,6-dimethoxy-1,3-dioxane*

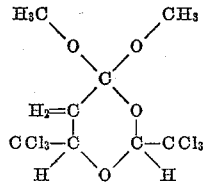

110.6 grams (0.75 mole) of anhydrous chloral was added dropwise with stirring to 90 grams (0.75 mole) of trimethyl orthoacetate dissolved in 150 milliliters of Skellysolve B under anhydrous conditions with cooling in an ice bath to 1° C. over a one hour period. The stirring was continued for one and one-half hours following the addition. Following this period the reaction vessel and contents were removed from the ice bath and the temperature rose to 32° C. in seven hours. Thereafter the reaction mixture was maintained at room temperature whereupon a solid crystalline product precipitated. This latter precipitate was recovered by filtration and the filtrate heated for three hours, cooled and filtered. Additional product was recovered. Removal of the solvent from the filtrate yielded still further product. Upon recrystallization of these crops of crystals from Skellysolve B, a trimethyl 3-hydroxy-4,4,4-trichloroorthobutyrate intermediate was obtained and found to melt at 87°–88° C.

66.8 grams (0.25 mole) of the trimethyl 3-hydroxy-4,4,4-trichloroorthobutyrate intermediate and 73.7 grams (0.5 mole) of anhydrous chloral were mixed together and the resulting mixture heated for ten hours at 120°–135° C. and maintained under reflux. Upon cooling to room temperature the reaction mixture solidified. Thereafter the reaction mixture was fractionally distilled under reduced pressure to separate the low-boiling by-products and to obtain the crude reaction product as a residue. The latter upon recrystallization from methanol, yielded a 2,4 - bis(trichloromethyl) - 6,6 - dimethoxy - 1,3-dioxane product melting at 108°–109° C.

In a similar manner, other 2,4-bis(polychloroalkyl)-5-alkyl-6,6-dialkoxy-1,3-dioxanes may be prepared as follows:

2,4-bis(1,1,2-trichloroethyl)-5-octyl - 6,6 - dibutoxy-1,3-dioxane by reacting one mole of tributyl ortho-n-decanoate with 2 moles of anhydrous 2,2,3-trichloropropionaldehyde.

2,4-bis(trichloromethyl)-5-pentyl - 6,6 - dipropoxy-1,3-dioxane by reacting tripropyl ortho-n-heptanoate and anhydrous chloral.

The compounds of the present invention are useful for the production of 1,3-dioxan-6-one compounds as set forth above. Certain of said 1,3-dioxan-6-one compounds are described and claimed in our copending application, Serial No. 675,574, filed August 1, 1957, now U.S. Patent No. 2,854,460.

The compounds of the present invention have been tested and found to be useful as fungicides and herbicides. The compounds may be employed as dusts by admixture with inert pulverized materials such as bentonite, attapulgite and the like. Also the powder or dust compositions containing the active ingredient may be employed as aqueous or petroleum dispersion with or without the aid of a wetting or dispersing agent. The active ingredient may also be employed in aqueous spray compositions by admixture with a wetting or dispersing agent. In representative operations substantial control of *Alterneria solani* was obtained with aqueous spray compositions containing 0.50 pounds of 2,4-bis(trichloromethyl)-6,6-dimethoxy-1,3-dioxane and 2,4-bis(1,1,2-trichloropropyl)-5-methyl-6,6-dimethoxy-1,3-dioxane. Further, operations show 2,4-bis(trichloromethyl) - 5 - methyl-6,6-dimethoxy-1,3-dioxane gave substantially complete control of Japanese millet when applied as an aqueous drench at a concentration of 50 pounds per acre.

This application is a continuation-in-part of our copending application, Serial No. 675,544, filed August 1, 1957, now abandoned.

We claim:
1. A 1,3-dioxane compound having the structure

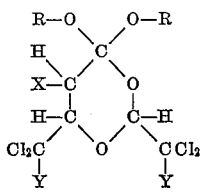

wherein R is lower alkyl, X is a member selected from the group consisting of hydrogen and lower alkyl radicals, and Y is a member selected from the group consisting of chlorine, chloromethyl and α-chloroethyl.

2. 2,4-bis(trichloromethyl)-5-methyl - 6,6 - diethoxy-1,3-dioxane.

3. 2,4-bis(trichloromethyl)-5-methyl - 6,6 - dimethoxy-1,3-dioxane.

4. 2,4 - bis(1,1,2-trichloropropyl)-5-methyl-6,6-dimethoxy-1,3-dioxane.

5. 2,4-bis(trichloromethyl)-5-propyl - 6,6 - dimethoxy-1,3-dioxane.

6. 2,4-bis(trichloromethyl)-6,6-dimethoxy-1,3-dioxane.

References Cited in the file of this patent
UNITED STATES PATENTS

| | | |
|---|---|---|
| 2,854,460 | Hennes et al. | Sept. 30, 1958 |
| 2,863,876 | Lott et al. | Dec. 9, 1958 |